Nov. 12, 1935.                O. L. SNYDER                2,020,621
                             AIRCRAFT ENGINE
                           Filed Jan. 2, 1932
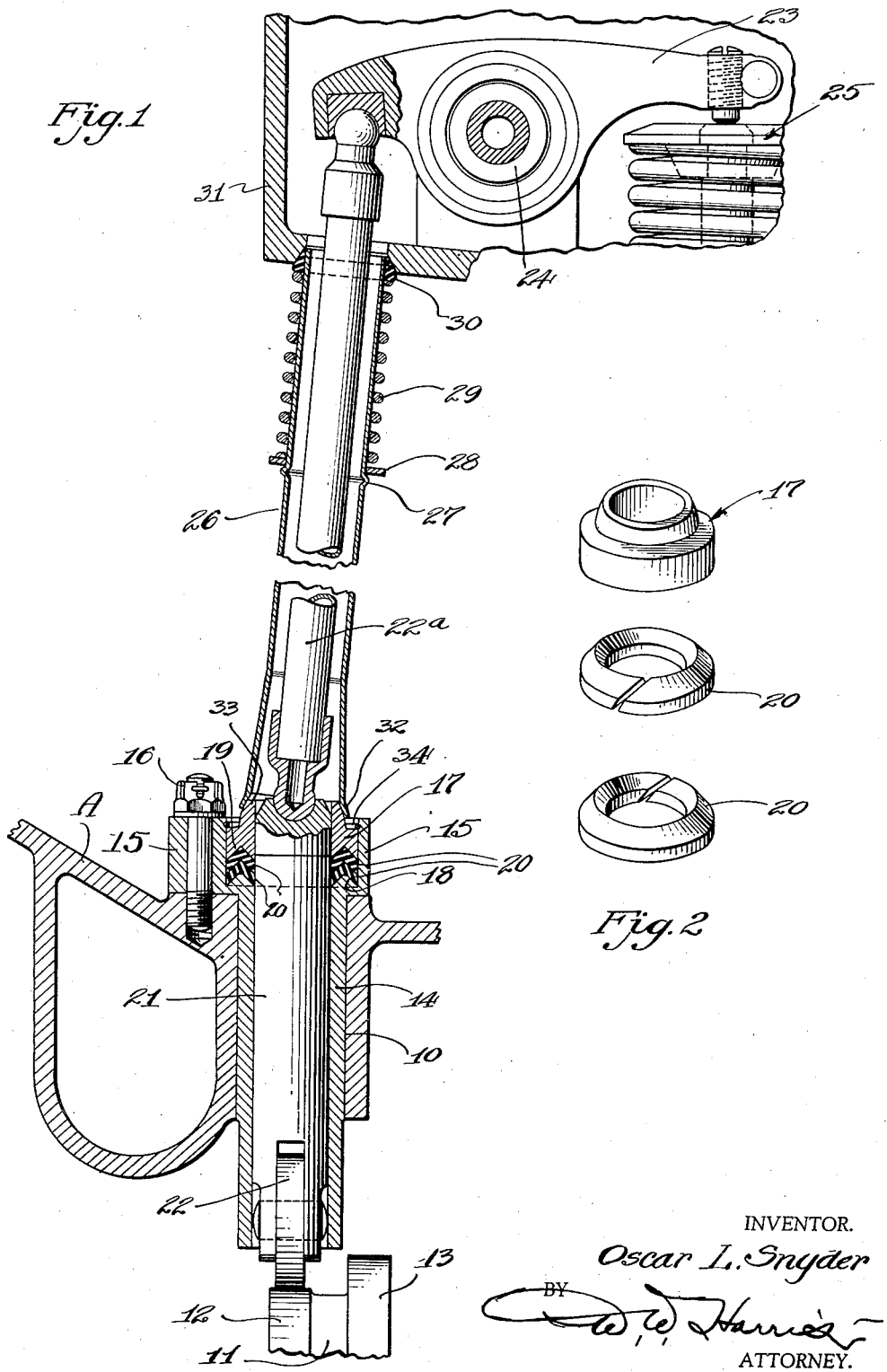
INVENTOR.
Oscar L. Snyder
BY
ATTORNEY.

Patented Nov. 12, 1935

2,020,621

UNITED STATES PATENT OFFICE 2,020,621

AIRCRAFT ENGINE

Oscar L. Snyder, Marysville, Mich., assignor to Continental Motors Corporation, Detroit, Mich., a corporation of Virginia Application January 2, 1932, Serial No. 584,474

9 Claims. (Cl. 123—90)

This invention relates to aircraft engines and refers more particularly to improvements in valve actuating mechanism for engines of the aforesaid type and for other types employing valve operating push rods.

Considerable difficulty has been experienced in engines of the aforesaid type in effectively sealing the tappet guide or guides against escape of oil. Many aircraft engines are positioned forwardly of the pilot seat and escape of oil between the tappets and their associated guides frequently results in this oil being carried by the air stream rearwardly of the engine to the pilot's windshield so as to obscure his vision. Escape of such oil is also objectionable from the standpoint of excessive oil consumption.

It is an object of my invention to provide an improved valve actuating mechanism adapted to overcome the aforesaid difficulties. It is a further object of my invention to provide an improved tappet seal actuated under pressure derived from the thrust of a push rod housing.

It is customary to yieldingly seat the push rod housing and one feature of my invention resides in utilizing this yielding action for effecting a pressure sealing means for the tappet.

Further objects and advantages of my invention reside in the novel combination and arrangement of parts more particularly hereinafter described and claimed, reference being had to the accompanying drawing in which:

Fig. 1 is a sectional elevation view through a typical valve actuating unit illustrating my improved tappet sealing device, and Fig. 2 is a perspective view illustrating the sealing elements and packing gland ready for assembly.

In the drawing reference character A represents a portion of an engine casing structure having a plurality of cylindrical bores 10 opening inwardly of the casing towards the cam 11 having cam faces 12 and 13.

In Fig. 1, I have illustrated the actuating mechanism for one valve, it being understood that this construction is duplicated in sets of intake and exhaust valve actuating mechanisms for the number of cylinders of the engine.

Located within the bore 10 is a cylindrical tappet guide 14 formed with an enlarged outer end portion 15 secured by one or more fastening devices 16 to casing A, the enlarged portion 15 receiving a packing gland 17. The guide portion 15 and gland 17 have complementary inclined faces 18 and 19 respectively and between these faces are located the annular split sealing rings 20 of suitable material such as rubberized fabric or other well known shaft packing material. By reason of the faces 18 and 19 the packing material is forced inwardly to seal the tappet as gland 17 is forced downwardly as will be later apparent.

Fitted within the guide 14 and gland 17 for reciprocating movement therein is a tappet 21 carrying a roller follower 22 engaging cam face 12, the tappet at its other end being adapted to actuate a push rod 22ª. The push rod in turn actuates the usual rocker arm 23 having a bearing 24, the rocker arm acting on valve mechanism 25 in the usual way. A tubular push rod housing 26 surrounds push rod 22ª and is formed with an abutment 27 against which a washer 28 is seated, this washer forming a seat for spring 29. The other end of this spring acts on a sealing ring 30 to form a joint between the push rod housing and the rocker arm housing 31. By reason of springs 29 the push rod housing 26 is yieldingly urged longitudinally of push rod 22ª in the general direction of tappet 21, the lower end of push rod housing 26 being flared at 32 for receiving the rounded annular extension 33 of gland 17. A spring clamp 34 serves to hold the gland and sealing elements in assembled position.

In operation the tappet 21 is reciprocated by cam 11 to actuate push rod 22ª, rocker arm 23 and valve mechanism 25, the push rod housing 26 under the influence of spring 29 urging gland 17 downwardly as viewed in Fig. 1 so as to force the sealing elements 20 yieldingly toward tappet 21. In this manner any lubricating oil which tends to move upwardly from casing A beyond tappet 21 will be sealed by the elements 20 against escape upwardly of tappet 21. The gland 17 thus serves the purpose of a seat for the push rod housing and also acts on the sealing elements to effectively seal the tappet against oil leakage.

What I claim as my invention is:

1. Valve actuating mechanism of the character described including a push rod, a tappet actuating said push rod, sealing means for said tappet, a push rod housing, and yielding means acting to seat said housing and also acting on said sealing means.

2. Valve actuating mechanism of the character described including a tappet, sealing means for the tappet, a gland around the tappet and acting on the sealing means, a push rod actuated by said tappet, and a push rod housing seated on said gland.

3. Valve actuating mechanism of the character described including a tappet, sealing means for the tappet, a gland around the tappet and acting on the sealing means, a push rod actuated by said tappet, and a push rod housing seated on said gland, and yielding means exerting a pressure on said sealing means.

4. Valve actuating mechanism of the character described including a tappet, sealing means for the tappet, a gland around the tappet and acting on the sealing means, a push rod actuated by said tappet, and a push rod housing seated on said gland, and yielding means urging said housing against said gland.

5. Valve actuating mechanism of the character described including a push rod, a tappet actuating said push rod, a tappet guide, sealing means supported by said guide and engaging said tappet to prevent leakage of oil intermediate said tappet and guide, a gland around the tappet and seating on said sealing means, a push rod housing seated on said gland, and yielding means urging said housing against said gland whereby to urge said sealing means into sealing contact with said tappet.

6. In a valve actuating mechanism of the character described including a push rod, a tappet actuating said push rod, a tappet guide having an annular seat constructed of relatively inclined seating faces, a tappet sealing mechanism comprising a deformable sealing means supported by said annular seat and engaging said tappet to prevent leakage of oil intermediate said tappet and guide, a gland around the tappet and engaging the sealing means and yielding means acting on said gland and deforming the sealing means into sealing contact with said tappet.

7. In a valve actuating mechanism of the character described including a push rod, a tappet actuating said push rod, a tappet guide having a recessed portion provided with an annular projecting rib forming a seat, a tappet sealing mechanism comprising a sealing means seated in said recessed portion and engaging said tappet to prevent leakage of oil intermediate said tappet and guide, a gland engaging said sealing means, and yielding means acting on said gland, said gland and seat cooperating together in response to the action of the yielding means to deform said sealing means and urge same into sealing contact with said tappet.

8. Valve actuating mechanism of the character described including a push rod, a tappet actuating said push rod, a tappet guide having a recessed portion, sealing means seated in said recessed portion and engaging said tappet, a gland around said tappet and seating on said sealing means, the aforesaid gland and sealing means substantially housed within the recess of said tappet guide, a push rod housing seated on said gland, and yielding means urging said housing against said gland whereby to urge said sealing means into sealing contact with said tappet.

9. In a valve actuating mechanism of the character described including a push rod, a tappet actuating said push rod, and a tappet guide having an annular seat constructed of relatively inclined seating faces, sealing means for said tappet including a deformable sealing ring having faces complementary to the inclined faces of the seat for operative engagement therewith, a gland overlying said sealing ring, and yielding means acting on said gland and deforming said sealing means to urge same into sealing contact with the tappet.

OSCAR L. SNYDER.